Patented Aug. 23, 1949

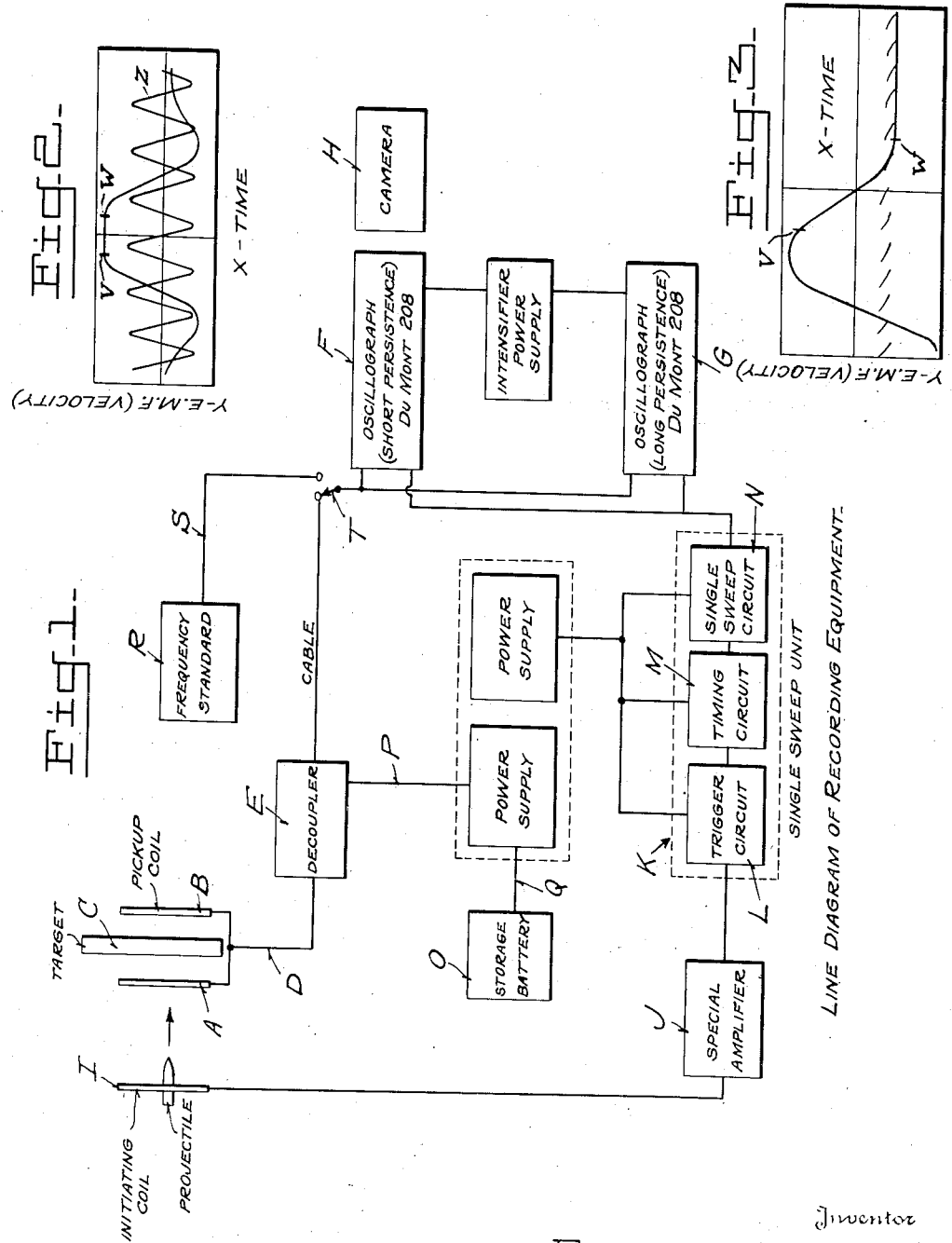

2,479,808

UNITED STATES PATENT OFFICE 2,479,808

ELECTROMAGNETIC APPARATUS FOR MEASURING PROJECTILE VELOCITY DURING PENETRATION

Richard A. Beth, Cleveland, Ohio, assignor to the United States of America as represented by the Secretary of War Application March 28, 1947, Serial No. 737,920

4 Claims. (Cl. 161—18)

The present invention relates to apparatus for measuring the velocity of projectiles and is more particularly concerned with an apparatus for obtaining the velocity of a magnetized projectile as a function of time during deceleration in a resistant target by quantitatively recording the electromotive force induced in suitably disposed coils.

The principal object of the present invention is to provide apparatus suitable for measuring projectile velocity as a function of time during penetration of non-magnetic and non-conducting targets such as concrete.

A further and important object of the invention is to provide apparatus giving a visual record of the deceleration of a projectile moving into or through a resistant target for quickly and readily obtaining this information for adding to the available knowledge of the behavior of projectiles under these conditions.

A still further object of the present invention is to improve on projectile velocity measuring apparatus of the electro-magnetic type by providing an apparatus which gives a visual indication of a graph of the projectile velocity as a function of time and which also substantially eliminates the effects of changes in the magnetic moment of the projectile by making these changes as small as possible.

Other object of the invention will be in part obvious and in part pointed out in the following detail description of the accompanying illustrations of the present invention, wherein:

Figure 1 is a diagrammatic illustration of the recording equipment according to the present invention.

Figure 2 is the normal oscillograph record obtained with the present apparatus of a projectile passing between the pick-up coils without striking a target.

Figure 3 is another oscillograph record obtained with the present apparatus of a projectile perforating a concrete target positioned between the pick-up coils.

Referring now more particularly to Figure 1, the present apparatus employs a pair of pick-up coils A and B which can, for example, be satisfactorily formed with each having a 9.0 inch inside diameter produced by 100 turns of No. 22 D. C. C. copper wire on a Bakelite form with windings about ⅜ inch wide and ¼ inch deep. For measuring instantaneous projectile velocity coaxial coils A and B are connected in series opposing and mounted about 1.80 radii apart with the target C, when employed, positioned in the middle third of the interval between said coils. Under these conditions, if the coils are of equal diameters, the resultant voltage induced in this middle third interval is very nearly a linear function of the instantaneous velocity, so that measurement of this induced E. M. F. on an oscilloscope will give an accurate indication of the deceleration of the projectile during penetration.

For use in studying the magnetic stability of projectiles, coils A and B are spaced 1.10 radii apart and connected in series aiding.

The coils A and B are connected to recording equipment through a length of cable D which is in practice about 200 feet long inasmuch as the recording equipment must be positioned some distance from said coils for protection. The capacity of the cable D has a tendency to form oscillations in the circuit and therefore a decoupler E consisting of a cathode follower stage is inserted in the circuit near the coils A and B to suppress the capacity effect of the cable before the signal passes into said cable D by raising the resonant frequency of the coil circuit.

The recording equipment connected by said cable D to coils A and B consists of two cathode ray oscillographs F and G, such as model 208 produced by the Allen B. duMont Laboratory, Inc., connected in parallel to produce identical traces. Oscillograph F has a short persistence screen and is equipped with a camera H and camera controls for photographically recording graphs produced on this screen. The second oscillograph G has a long persistence screen for visual observation to give immediate information on the nature of the trace obtained.

The recording cycle is initiated by a coil I placed in front of and a suitable distance ahead of said pick-up coils A and B. Said coil I is connected to a special amplifier J and from there to a single sweep unit K composed of a trigger circuit L, timing circuit M, and single sweep circuit N. The single sweep unit K is in turn connected to said oscillographs F and G.

Current is supplied to decoupler E and said single sweep unit K from a storage battery O or other source of electrical current through cables P and Q respectively.

A frequency standard device R of any known type can be introduced into the recording circuit for superimposing a standard frequency pattern on the oscillograph screens through cable S by operating switch T which will then disconnect coils A and B from said oscillographs F and G.

To operate the apparatus it is necessary to employ a magnetized projectile which is as magnetically stable as possible to minimize the effect of changes in magnetic moment on the induced electromotive force due to the firing of the projectile and the subsequent striking of the target. The projectiles should be prepared by subjecting them to an artificial aging heat treatment for several days and then be magnetized by means of a large electromagnet until magnetically saturated. Further the projectiles should be given a magnetic stabilizing treatment by placing them in a solenoid energized with 60 cycle alternating current to produce various peak field strengths. In the case of a Cal. .50 projectile a heat of 105° C. for two days was found desirable for ageing the projectile.

Firing the magnetized projectile through the initiating coil I produces an electromotive force which is conducted to said special amplifier J where the signal is amplified, clipped and differentiated to give a sharp single pulse at the instant the projectile passes through the center of coil I.

The resulting pulse actuates the trigger circuit L which in turn begins operation of the single sweep unit K. The function of unit K is twofold in that it provides a single-sweep voltage changing linearly with time which is applied to the X-plates of both oscillographs F and G and also provides a square wave which is applied to the grids of said oscillographs through their Z-axis amplifiers to turn on the electron beams and turn them off after the sweep is completed.

Immediately after the sweep has been initiated, the projectile passes through the pick-up coils A and B. The induced electromotive force is impressed across the input of the decoupler E and then through switch T to the Y-axis amplifier of said oscillographs F and G. The resultant trace on the screen of oscillograph F is photographed with camera H for subsequent analysis. The frequency standard R is then employed to superimpose a calibrating trace upon the picture immediately after the projectile trace has been completed using the same sweep rate as the original recording to provide a means for measuring time intervals, by operating switch T.

The resulting picture will normally be similar to the illustrated graph in Figure 2 if no target is present, which shows that the X-axis sweep is very nearly proportional to time except at the beginning and end, and the induced electromotive force of coil system A, B, is directly proportional to the instantaneous projectile velocity in the central region between the coils, as indicated by section V—W of the curve of induced E. M. F. The sinusoidal timing curve Z is produced by the frequency standard R. The oscillograph trace is therefore a graph of projectile velocity as a function of time in the region V—W, which corresponds to the target region being studied. Figure 3 shows the graph obtained with a cement target C between the pick-up coils A and B. Under these conditions, the induced voltage curve in the region V—W shows the manner in which the projectile was slowed down during its transit through the cement, until it broke through, after which the velocity was substantially constant during the remaining interval shown on the graph.

When desirable larger sized coils A and B can be employed which permits use of larger targets and projectiles. For example, pick-up coils of a 30 inch diameter formed with 50 turns of No. 22 vinylite-covered wire positioned 1.80 radii apart can be employed. However, since the electromotive force would be considerably less with these coils due to the increased radius and the smaller number of turns, a preamplifier is necessary between the cable D and the Y-axis amplifiers of the oscillographs.

It is to be understood that the target C and other bodies in the immediate vicinity of the apparatus should be reasonably non-magnetic and non-conducting so that undesirable magnetic and eddy-current effects may be avoided. The term target as used herein is meant to include targets of this type.

I claim:

1. Apparatus for measuring the velocity as a function of time during penetration of a magnetized projectile comprising a pair of electrical coils coaxially spaced from one another and connected in series opposing, a non-magnetic and non-conductive resistant target positioned between said coils, an oscilloscope operatively connected to said coils so as to indicate the instantaneous resultant voltage induced in said coil system by said projectile during the passage of said bullet in the target region.

2. The invention as recited in claim 1 wherein said coils are of equal diameter and the axial distance between said coils is substantially 0.9 of the coil diameter.

3. The invention as recited in claim 2 wherein said oscilloscope is of the cathode ray type having horizontal timing deflection plates and vertical amplitude deflection plates, and including electrical means responsive to motion of the projectile at a predetermined distance before the target for initiating a single sweep of the horizontal deflection plates during the time that the projectile is in motion between said coils, said vertical deflection plates being actuated by the output of said coils to produce a vertical deflection which is a function of the voltage induced in said coils, to produce a visual record of the projectile's motion.

4. The invention recited in claim 3, including means for superimposing a standard frequency pattern on said visual projectile record.

RICHARD A. BETH.

REFERENCES CITED

The following references are of record in the file of this patent:

UNITED STATES PATENTS

| Number | Name | Date |
| --- | --- | --- |
| 1,357,281 | Du Pont | Nov. 2, 1920 |
| 2,146,723 | Dunham et al. | Feb. 14, 1939 |
| 2,186,268 | Pakala | Jan. 9, 1940 |
| 2,200,055 | Burnett | May 7, 1940 |
| 2,301,193 | Bradford et al. | Nov. 10, 1942 |
| 2,301,197 | Bradford | Nov. 10, 1942 |
| 2,355,363 | Christaldi | Aug. 8, 1944 |
| 2,400,189 | Carlson | May 14, 1946 |
| 2,414,477 | Meacham | Jan. 21, 1947 |

OTHER REFERENCES

Publication "Radar Electronic Fundamentals," Navy Dept., Navships 900,016.